Figure 1:
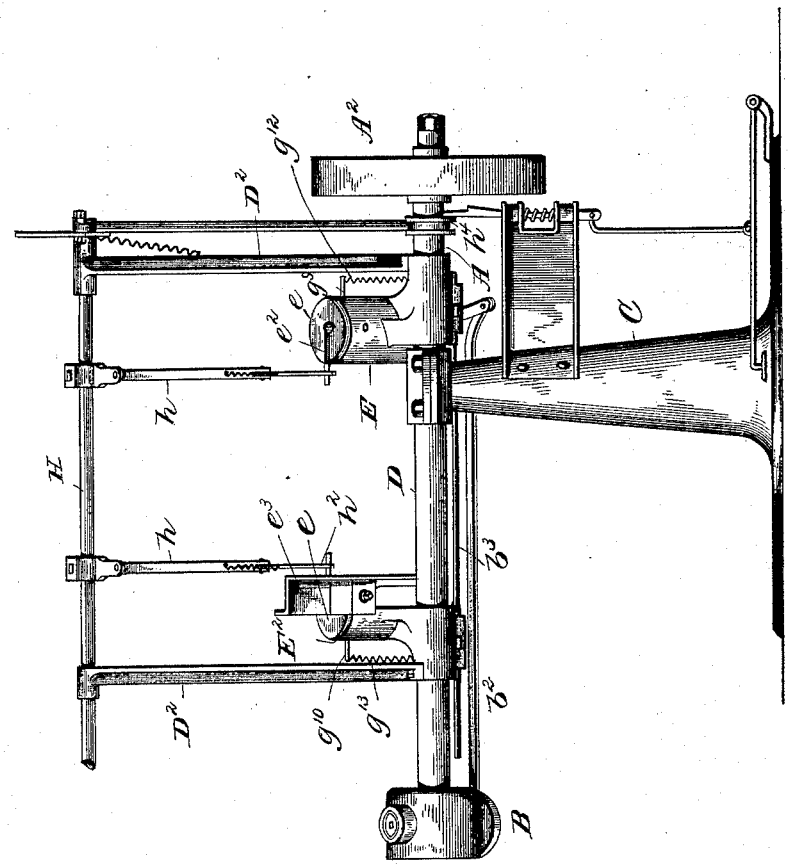

(No Model.)  5 Sheets—Sheet 1.

R. GREGG.
MACHINE FOR MAKING CANS.

No. 489,250. Patented Jan. 3, 1893.

Witnesses
Paul W. Stevens
David H. Mead

Inventor:
Robert Gregg,
By R. S. Dyrenforth,
his Attorney.

(No Model.) 5 Sheets—Sheet 3.
R. GREGG.
MACHINE FOR MAKING CANS.

No. 489,250. Patented Jan. 3, 1893.

Witnesses
Paul W. Stevens
David H. Mead

Inventor:
Robert Gregg,
By R. S. Dyrenforth,
his Attorney.

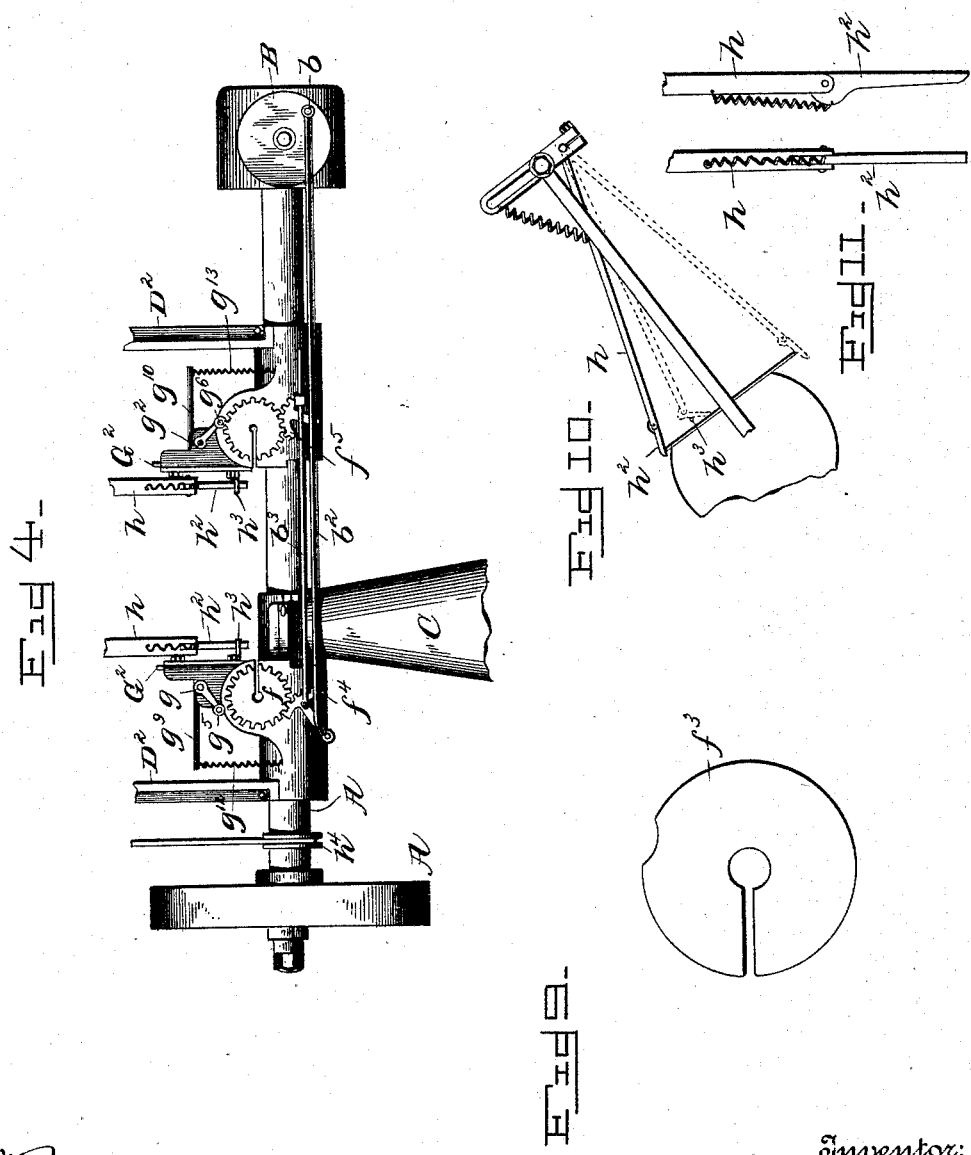

(No Model.)
5 Sheets—Sheet 5.
R. GREGG.
MACHINE FOR MAKING CANS.
No. 489,250. Patented Jan. 3, 1893.
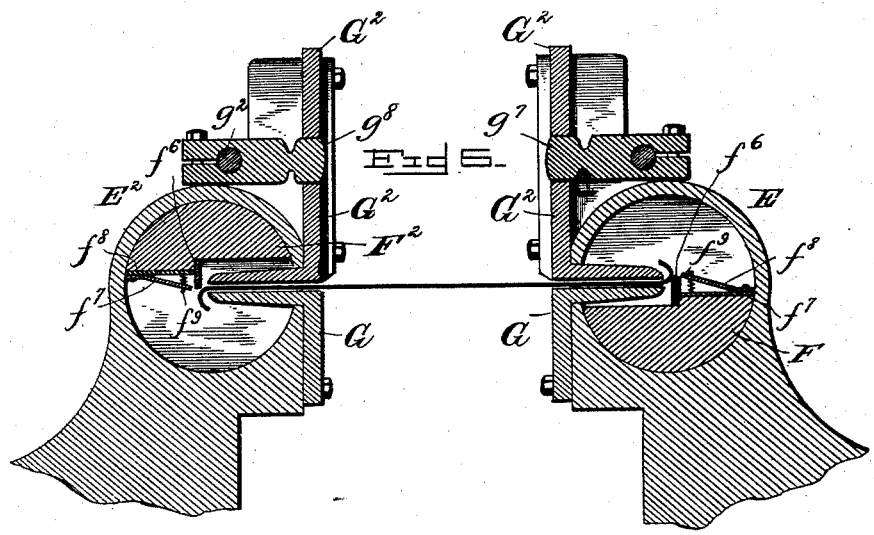
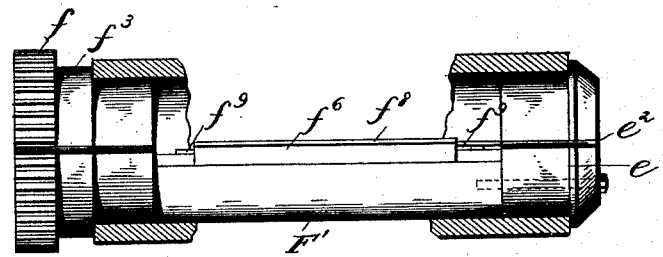
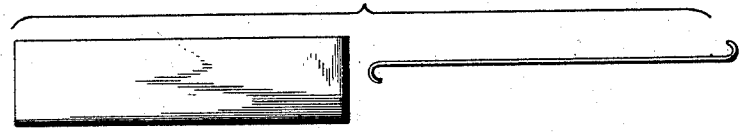
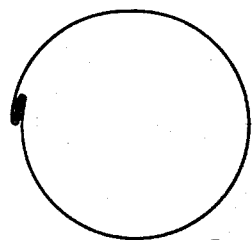
Witnesses
Paul W. Stevens
David H. Mead
Inventor
Robert Gregg,
By R. S. Dyrenforth
his Attorney

UNITED STATES PATENT OFFICE.

ROBERT GREGG, OF CHICAGO, ILLINOIS, ASSIGNOR TO THE FAIRBANK CANNING COMPANY, OF SAME PLACE.

MACHINE FOR MAKING CANS.

SPECIFICATION forming part of Letters Patent No. 489,250, dated January 3, 1893.

Application filed December 30, 1891. Serial No. 416,612. (No model.)

*To all whom it may concern:*

Be it known that I, ROBERT GREGG, a citizen of the United States, residing at Chicago, in the county of Cook and State of Illinois, have invented certain new and useful Improvements in Machines for Edging Sheets for Can-Bodies; and I do hereby declare the following to be a full, clear, and exact description of the invention, such as will enable others skilled in the art to which it appertains to make and use the same.

This invention relates to a machine for edging sheets for can bodies which have in their bodies a side seam formed by interlocking the hook-shaped ends of a blank and securing them together, as by pressure and the application of solder.

The object is to produce a rapidly operating, and, at the same time, simple machine by which hooks may be formed on the ends of a blank in proper manner to allow them to be interlocked preparatory to their being permanently fastened together; furthermore, to produce a machine by which the blank from which the body of a sheet-metal can is to be formed, may be clamped automatically in place, its ends be bent to form hooks, and the blank be released after the proper shape has been imparted to the ends, and then be delivered from the machine.

With these objects in view, the invention resides essentially in a machine comprising two boxes, into which, together, a blank from which a can-body is to be formed, is introduced, and formers consisting of movable blocks to be brought into contact with the ends of the blanks to bend them to form hooks; furthermore, in a machine comprising two boxes into which a blank for a can-body is introduced, clamping jaws by which the blank is held, and formers consisting of movable blocks to be brought into contact with the ends to bend them to form hooks; furthermore, in a machine for use in making sheet-metal cans, comprising two boxes into which a can-body blank is to be introduced, clamping jaws, formers consisting of movable blocks to turn the ends, and a pivoted frame by which the blanks are released after having their ends bent, and are discharged; and, finally, in various novel details of construction whereby the objects are attained.

Figure 2:
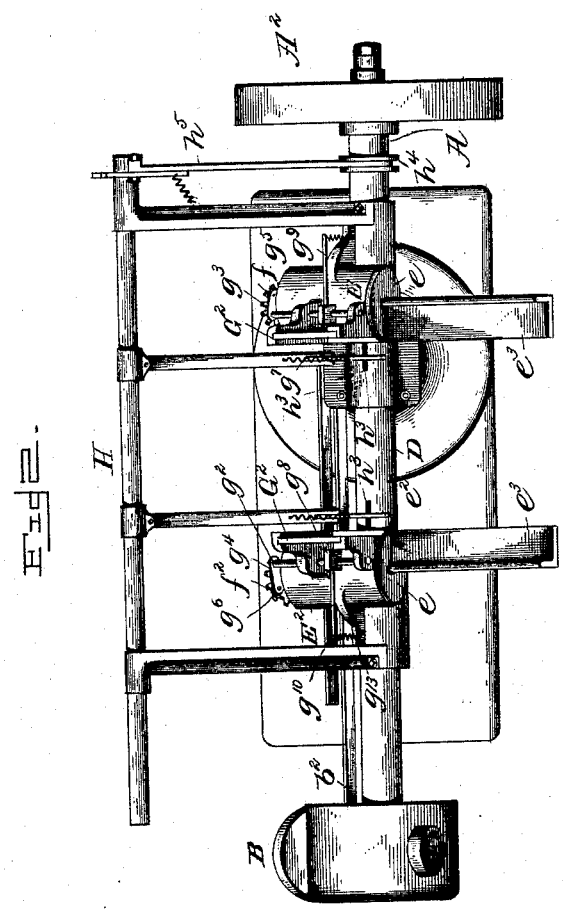
Figure 3:
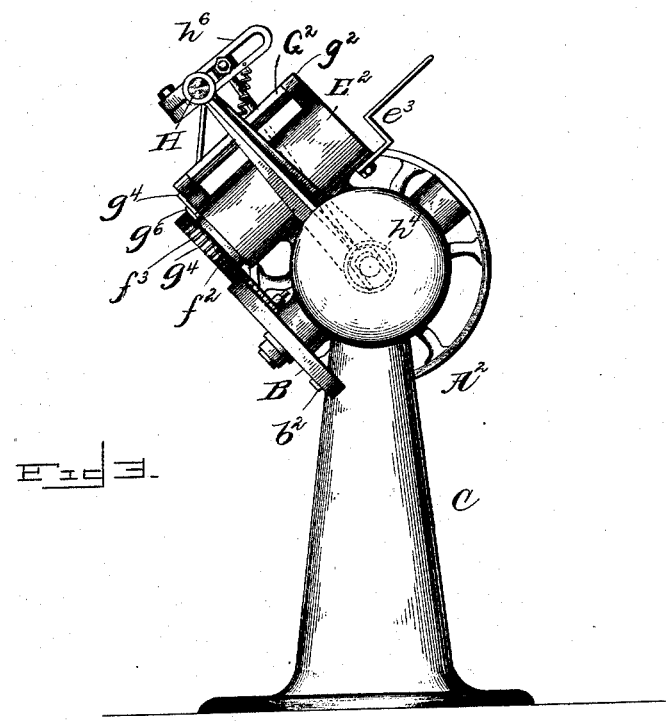
Figure 5:
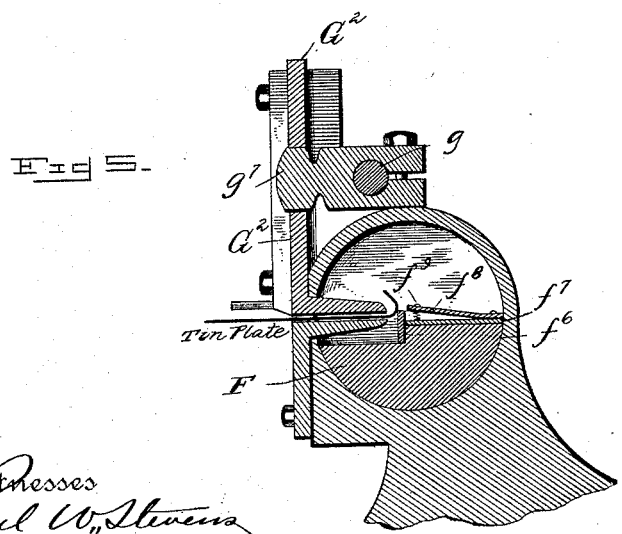

In the accompanying drawings: Figure 1—is a view in front elevation with one of the slides by which the blanks are directed to the boxes removed, in order to show the cleft in a box where a blank is introduced; Fig. 2—is a view in perspective, from above, of the machine; Fig. 3—is a view in side elevation of the machine; Fig. 4—is a view in rear elevation of the machine; taken at a point below the working parts; Fig. 5—is a view in cross section of one of the boxes, showing the clamping jaws, means for forcing the jaws together, a movable block or former by which an end of the plate is turned to form a hook, and a gage; Fig. 6—is a view in transverse section across both boxes, showing the two boxes of a machine, the clamping jaws, the movable blocks or formers by which the ends are bent, and the gages, and, in dotted lines, a sheet of tin-plate in position in the jaws; Fig. 7—is a view, partly in side elevation, partly in vertical, longitudinal section with part of the casing broken away, of the box with the former below, showing a gear-wheel, a cam-wheel, guide-heads, the former with shoulder-bar, and the box-head movable with the former; Fig. 8—is a view representing the various stages of the blank from its merely flat and plain form to its formation into a can-body with ends joined, viz; the plain blank, the blank after having its ends bent to form hooks; and two representations of the blank bent into circular form with its ends hooked, and the last representation somewhat exaggerated, to show the ends hooked together, preparatory to the body being placed upon the mandrel of another machine, preferably that shown in an application filed by me December 15, 1891, Serial No. 415,157. Fig. 9—is a detail view of one of the two like cams; Fig. 10—is a view in detail of the eccentric rod and link to operate the rock-shaft, showing, in full lines, part of an upright, part of the eccentric-rod, part of the end of the frame adjoining a box, and a finger in the act of striking and pushing the sheet of metal to expel it, and, in dotted lines, the positions of a finger, first as thrown to its lowest position at a box by the spring and acting as a stop, and then as being returned by the eccentric over the pin to the place where the spring will throw it back, causing it to kick the plate; and Fig. 11—is a view in detail of the fingers, showing their spring joints.

In these drawings, A represents the main driving-shaft of the machine, properly housed and provided at one end with a band-wheel $A^2$, and connected at the other end, by suitable gearing, (not shown,) with a disk or wheel B, to turn this in a plane at a right angle to the plane of motion of the end of the shaft.

The machine is mounted on a standard C, which supports the frame D, of the machine, carrying uprights $D^2$. On this frame are mounted two cylindrical boxes E $E^2$, inclined sharply downward from front to rear. The boxes have heads $e$ and are provided each with a radial cleft $e^2$, permitting the introduction of the blank to be operated upon. To the front of each of the boxes E, $E^2$, is attached a guideway $e^3$, upon which the blank, the ends whereof are to be bent, is placed, and by these ways each blank is guided into the machine.

Arranged within the boxes E, $E^2$, respectively, are bolted to and turning with the heads $e$, are blocks or formers F, $F^2$, which are shown as nearly semi-cylindrical between guide-heads at their ends and each semi-cylindrical part with a central vertical offset or shoulder on the flat side of its body, leaving a depression and an elevation there. The block F remains normally in the lower portion of the box E while the block $F^2$ remains normally in the upper portion of the box $E^2$, and the blocks are set with the depressions toward each other; so that when motion is imparted to turn the blocks in the same direction, the block F will bend one end of the blank upward, and the block $F^2$ will bend the other end downward. The rear ends of the blocks or formers F, $F^2$, are provided with gear-wheels $f, f^2$, and with the cam-wheels $f^3$ both gear and cam wheels being provided with clefts which are enlarged at their inner ends, permitting the passage of the blanks after their ends are bent to form hooks. The cam-wheels are disks, each with a groove at about ninety degrees from its cleft and they are alike but are set with their clefts in opposite directions,—that is, facing each other.

Meshing with the gear-wheels $f, f^2$, are two toothed segments $f^4, f^5$. These segments are pivoted to the frame of the machine, and are connected with the wrist-pin $b$ on the disk B by the connecting rods $b^2$ and $b^3$. The rod $b^2$ at one end is journaled upon the wrist-pin $b$, and, at the other end, is pivoted to the segment $f^4$ below the point at which the same is pivoted to the frame of the machine. The rod $b^3$ is pivoted at one end, to the segment, above the point at which this is pivoted to the frame, and is pivoted at its other end to the segment $f^5$, above the point where it is pivoted to the frame; so that the two segments will have corresponding movements during the revolution of the disk or wheel B.

To determine the length of the hook at each end of the blank, that is to say, the distance from the ends at which the bending is to begin, a gage is desirable. This may consist of an adjustable shoulder-bar, or plate $f^6$, set on edge against each shoulder or offset, and extending preferably, somewhat above it, a bed-plate $f^8$ on the upper flat surface of each block, and a spring-plate $f^7$, for each bed-plate, adjustably set at an acute angle to its bed-plate by having its outer side in the direction of its length, adjustably set on the upper surface at the outside of the bed-plate, and its inner long edge in juxtaposition with its shoulder-bar and projecting somewhat above it, there being a rod $f^9$ over the spring-plate, to keep its edge from being pushed up, or from rising higher than to a position where the lower corner of the edge next the shoulder-bar will be a little below the upper surface of the bar. The rod $f^9$ is set in the head $e$. It will be understood that the bar will be between the guide-heads, and may be long or short, as desired. The blank will be inserted with its upper edge below the upper guide-head, and its lower edge above the lower guide-head, as held by the fingers presently to be described.

The jaws between which the ends of the blanks are clamped during the bending of the ends, and with which each box or cylinder is provided, are designated by the letters G and $G^2$. The lower jaws G are connected rigidly to the frame of the machine while the jaws $G^2$ are permitted a limited up and-down movement.

The guides or ways by which the blanks are introduced into the machine, are arranged in continuous inclined plane with the upper edges of the lower jaws. The upper jaws $G^2$ receive motion from the cam-wheels $f^3$. This motion is transmitted to the jaws through the rods $g, g^2$, which are each provided at their rear ends with depending arms $g^3, g^4$, having at their lower ends rollers or bowls $g^5, g^6$, bearing on the faces of the cam-wheels $f^3$. At the front ends, the rods $g, g^2$, have attached to them arms $g^7, g^8$, which bear in openings in upward extensions of the jaws $G^2$. The arms $g^7$ and $g^8$ have projecting from them rods $g^9, g^{10}$, to which are attached springs $g^{12}$, $g^{13}$, the lower ends of which are attached to the frame of the machine. The tendency of these springs is to raise the inner ends of the arms $g^7$, and $g^8$, and thus to raise the jaws $G^2$, to release the sheet-metal blanks when the ends of the arms $g^3, g^4$, are in the indentations in the cam-wheels $f^3$.

The machine will be so timed by the gears, by the relative sizes of the grooves in the cam-wheels, as regards the rollers or bowls, or by stopping the machine, that there will be a period of rest for the jaws before closing again to permit the ejection of a blank the ends of which have been turned and the insertion of a new one.

Supported in the uprights $D^2$ parallel with the main-shaft is a rock-shaft H, and fixed to and depending from this are two finger-rods or fingers, each composed of a long, upper joint $h$ and a short, lower joint $h^2$, pivoted together by a pin parallel with the shaft, (so that motion will be forward and back across the line of the main-shaft,) and supplied in front, from one joint to the other, across the pivot, with a spring, forming a spring joint. The side of each finger toward the front of the machine is its extensor face or back, and the side toward the back of the machine, its flexor face or front, though the joint will bend in both directions. The office or purpose of these fingers is to act as stops to the blank, upon its insertion, before the clamping jaws $G^2$ come down; and also to push the plate out after the blocks or formers have bent its ends, and the jaws $G^2$ have risen by the rollers or bowls dropping into the grooves in the cam-wheels $f^3$. To this end they are so arranged that they will hang normally to near the lower ends of the boxes, at any desirable place, (according to the depth of plate desired,) above the lower guide-heads, and between the boxes, each next to the side of a box, where they gage the distance to which a plate is to be inserted; but after the plate is in place and is held by the jaws, the fingers are moved to the upper edge of the plate by motion imparted to the rock-shaft, in one direction by an eccentric; while, at the time that the rollers or bowls drop into the cam-grooves and permit the jaws to be lifted by their springs, the fingers give the plate a smart tap at its upper edge by being given a quick motion back to their normal position, by a spring from an upright pulling back the rock shaft in the other direction, (see Fig. 10.)

Projecting inward from each box near its upper end and sufficiently above the cleft to cause the end of a finger, in its being rocked up toward the front of a box, to be entirely free from the plate and, upon escaping, to spring back against the upper edge of the plate, is a pin $h^3$. The shaft is rocked in one direction from an open yoke eccentric $h^4$ on the main shaft, having an eccentric rod $h^5$, which is pivoted at its upper end in a sliding block in a link $h^6$, fixed, at one end, to the rock-shaft H. Toward its outer end, the link is pulled upon by a spring attached to the adjoining upright.

The operation will be obvious: As the cam of the eccentric pushes the yoke up, the rod is carried upward and pushes up the link, rocking the shaft in one direction,—the direction which carries the fingers up over the pins to the upper end of the blank. As the bulge of the cam turns toward the open part of the yoke, the spring from the upright of the link, throws down the yoke and the rod quickly, suddenly pulling down the link, and quickly rocking the shaft in the other direction,—the direction which carries the fingers against the upper edge of the plate and back over the pins to their lower position to act as stops.

The machine may be started and stopped by the workman by means of a foot-lever, acting through a clutch, indicated.

Having thus fully described my invention, what I claim as new and desire to secure by Letters-Patent, is—

1. In a machine for edging sheets for can bodies, a frame, two boxes secured thereon, rotatable formers arranged within the boxes, clamping-jaws located contiguous to the formers, and an ejecting device adjacent to the said jaws.

2. In a machine for edging sheets for can bodies, a frame, two boxes secured thereon, rotatable formers arranged within the boxes, clamping-jaws located contiguous to the formers, an ejecting device adjacent to the said jaws, and guides connecting with the boxes.

3. In a machine for edging sheets for can bodies, a frame, two boxes secured thereon, rotatable formers arranged within the boxes, said formers being arranged one above and one below a horizontal line drawn through both boxes, clamping jaws located contiguous to the formers, and an ejecting device adjacent to the said jaws.

4. In a machine for edging sheets for can bodies, a frame, two blank-receiving boxes secured thereon, formers arranged within the boxes, a cam and gear mechanism carried by each former, a shaft carrying clamping-jaws projecting within the boxes, and arms carried by the shaft and engaging the cams, whereby the clamping-jaws are closed and the formers are rotated at one operation.

5. In a machine for edging sheets for can bodies, a frame, two boxes secured thereon, rotatable formers arranged within the boxes, a cam and gear mechanism carried by each former, a shaft carrying clamping-jaws projecting within the boxes, arms carried by the shaft and engaging the cams, and a rock-shaft carrying spring-fingers for ejecting the finished blank from the machine.

In testimony whereof I affix my signature in presence of two witnesses.

ROBERT GREGG.

Witnesses:
S. H. McLAUGHLIN,
THOMAS KORF.